ARM FOR RECORDING AND REPRODUCING APPARATUS

Filed Sept. 25, 1948

INVENTOR.
Ulrich L. di Ghilini (deceased)
Alexander E. di Ghilini and
Leo E. di Ghilini - administrators
By Lyon & Lyon ATTORNEYS.

Patented June 30, 1953 2,643,886

UNITED STATES PATENT OFFICE 2,643,886

ARM FOR RECORDING AND REPRODUCING APPARATUS

Ulrich L. di Ghilini, deceased, late of Beverly Hills, Calif., by Alexander E. di Ghilini and Leo E. di Ghilini, administrators, Beverly Hills, Calif.

Application September 25, 1948, Serial No. 51,241

1 Claim. (Cl. 274—23)

This invention relates to an apparatus for recording and reproducing sound on or from a disc record, and refers particularly to an arm for sound recording and reproducing apparatus which arm serves both in recording operations for properly supporting the recording stylus and, in reproducing operations, for properly holding the reproducing head and stylus. This application is a continuation in part of the co-pending application Serial No. 19,106, filed April 5, 1948, now Patent No. 2,537,214, issued January 9, 1951.

In sound recording on a disc record, the arm which holds the recording head is mechanically moved radially with respect to the disc record while the recording head is rigidly united with the arm so that its position on the recording blank is positively fixed by the position of the arm supporting the stylus. Moreover, the amount of weight or pressure applied from the arm to the stylus and hence to the recording blank must be accurately controlled, and should generally be considerably in excess of the weight desirable in reproducing operations, particularly where in the recording operation a large number of lines or recording grooves per radial inch of record are recorded, careful control must be maintained of the position of the stylus, which must be firmly locked to the arm supporting the same. In reproducing operations, however, at least a limited amount of play must exist between the arm supporting the head and the head, so that the position of the stylus on the record is determined by the groove on the record. Furthermore, a considerably lighter pressure must be employed in reproducing operations than in recording operations. When it is desired to provide in one device both recording and reproduction, unless two separate arms are provided, it is required, therefore, that there be provided an arm for holding the recording and playback head to which is attached the stylus, which arm is provided with means adjustable so that in recording operations the head is rigid with the arm and loaded with a predetermined weight and likewise adjustable to a second position for reproduction, in which a certain amount of play is permitted between the head and the arm and, moreover, in which the weight imposed on the stylus is less than that utilized in recording but also under careful control. It is also desirable that means be provided for moving such arm to three different positions, one being a disengaged position where the stylus is entirely lifted from the blank or record to allow shifting of the stylus with respect thereto, the second being a reproduction or playback position, and the third being a recording position.

It is the general object of the present invention to provide an improved form of arm for a sound recording and playback apparatus, together with associated means for positioning said arm in the three intended positions, which apparatus also includes novel means for accurately locking the head rigid with the arm in predetermined position for recording operations, together with means for properly controllably loading the stylus and also with means for releasing the head somewhat from the recording arm to allow the necessary freedom between the arm and the head, while controllably applying to the stylus the lesser weight required for playback operations.

The sound recording and playback arm and associated mechanism of the present invention, together with certain further objects and advantages of the invention, will be understood from the following description of the preferred form of the invention as illustrated in the accompanying drawing, in which.

Figures 1, 2, 3, 4, 5, 6, 7:
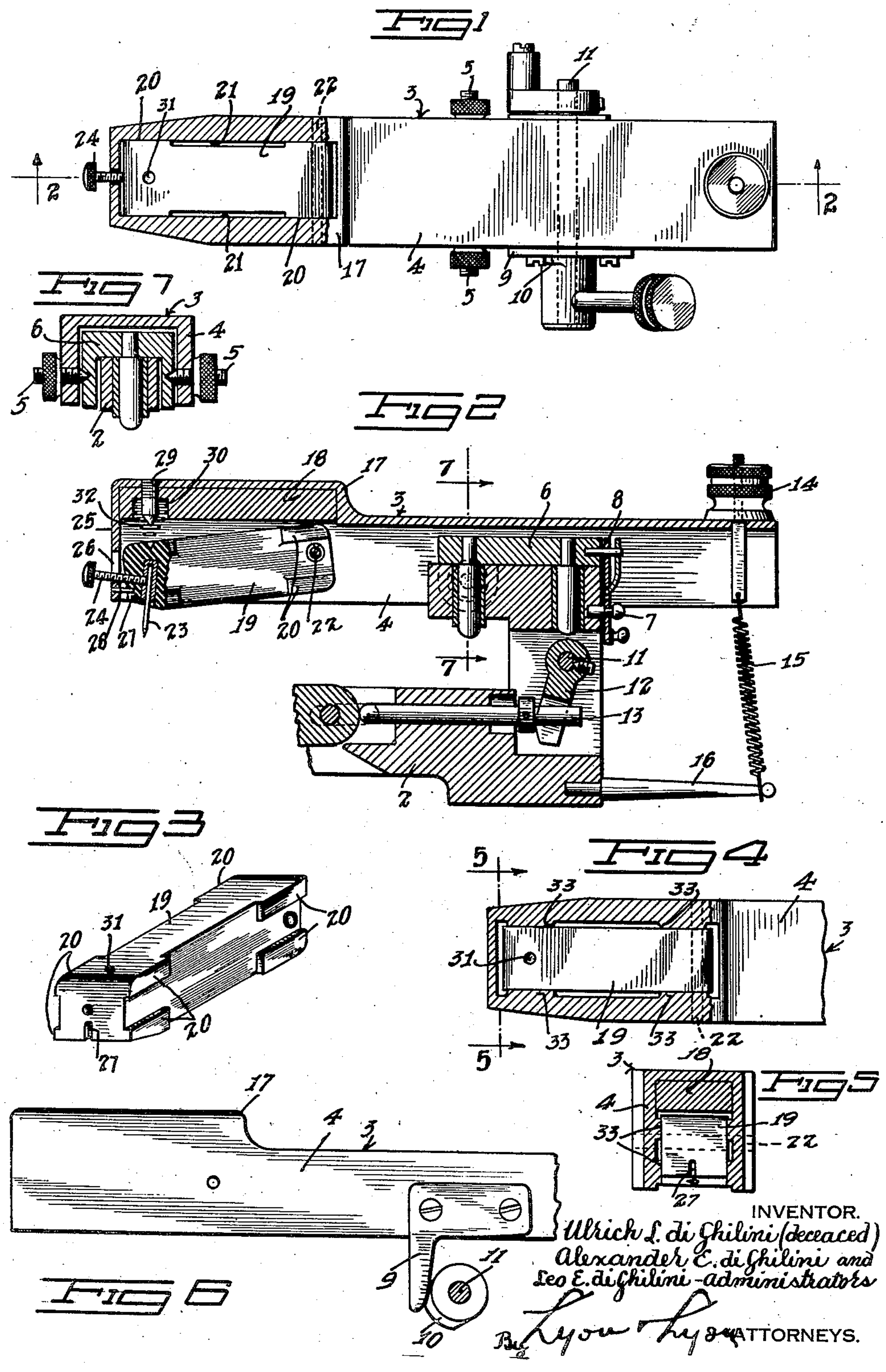
Figure 1 is a plan view partially in section.
Figure 2 is a section on the line 2—2 of Figure 1.
Figure 3 is a perspective view of the head.
Figure 4 is a fragmentary plan view partially in section showing a modified construction of the channel walls and the head.
Figure 5 is a section on the line 5—5 of Figure 4.
Figure 6 is a fragmentary side view of the arm of Figure 1.
Figure 7 is a section on the line 7—7 of Figure 2.

Referring to the drawings, 2 indicates a fragment of a carriage upon which the apparatus of the present invention may be mounted. In the drawing there is illustrated fragmentarily a carriage of the type described and claimed in the aforesaid co-pending application, which is there more fully illustrated, which is intended to be moved radially with respect to either a record or blank in recording or playback operations. Since, however, the head and mechanism of the present invention is not dependent upon any particular type of carriage for operating the same, the part 2 is to be considered as merely a diagrammatic illustration of a fragment of any usual or preferred type of carriage for that purpose.

The arm 3 of the present invention includes a substantially channel-shaped member 4, which is pivotally mounted for rotation about a horizontal axis by means of set screws 5 secured to a block 6 which may be a part of the carriage 2, but is indicated as non-rotatably fixed thereto by dowels 7 and a latch 8. The channel-shaped member 4 is indicated as having an extension 9, which may be engaged by operating the mechanism for pivoting this member to its various operating positions; for example, as illustrated, there is provided a cam 10 mounted on a shaft 11, actuated by a hand lever mounted on the shaft 11, and which also actuates a cam 12, which operates a rod 13 for controlling the position of a friction wheel (not shown). The specific means, however, by which the head is moved to its different positions may vary.

The one end of the channel member 4 is connected by an adjusting nut 14 with a spring 15, the other end of which is attached to an extension 16 from the carriage 2, and serves as a means by which an adjustment may be made of the weight imposed, as hereafter described, on the stylus.

On the opposite end of the channel member 4 from the spring 15 the member is enlarged as indicated at 17, and holds a weight 18 for weighting the left side of the member. Within this enlargement 17 there is mounted a recording and reproducing head 19, which may be any usual or preferred type, such as either a crystal or magnetic recording and playback head, all enclosed within a case the upright side walls 20 of which should have smooth vertical surfaces which make a bearing contact with the smooth vertical faces 21 on the inner sides of the section 17 of the channel member 4. These bearing faces thus permit a movement of the head 19 which is confined substantially to a vertical direction; a slight play, however, is permitted horizontally, amounting to a few thousandths of an inch. The head 19 is supported within the channel member 4 by being pivoted on a rod 22 supported by the member 4, a slight play being permitted between the head 19 and the rod 22, so that in playback position a sufficient movement of the head 19 relative to the member 4 is permissible so that it may accommodate itself to follow a recorded groove on a record in playback operations. This pickup head 19 is indicated as carrying a needle or stylus 23, for use in either recording or playback operations, the stylus being held in position by a setscrew 24. The channel member 4 has an endwall 25, provided with a vertical slot 26 to accommodate movement of the setscrew 24 which also operates as a stop to limit the downward movement of the head when the arm is lifted. There is also preferably provided a small slot 27, extending from the bottom of the front end of the head 19 into which is received a pin 28 carried by the upright front wall 25 of the channel member 4. This slot, in its engagement with the pin 28, serves to center the head properly with respect to the arm 4 when in the position indicated in Figure 2, for a purpose set forth hereinafter.

From the top of the section 17 there is a sharp-pointed setscrew 29 which extends through a suitable opening 30 in the weight 18. The point of this setscrew 29 is adapted, when the head 19 is pivoted upwardly, to engage a recess 31 in the top of the head and provide means for accurately aligning the head 19 with the channel member 4 when recording. There may also be provided a coil spring 32, which operates principally merely as a cushioning or steadying device without exerting appreciable pressure when the channel member 4 is dropped so as to bring the apparatus into playback or recording position.

In the operation of the apparatus of the present invention, the channel member 4 can be pivoted to three positions. In one position (Figure 2) the arm is elevated sufficiently above the blank or record so that the stylus 23 is released from contact therewith and the carriage moved. In the second position the arm is lowered sufficiently to engage the stylus 23 with a record for playback. The engagement of the pin 28 with the slot 27 at this time assures that the stylus 23 will be properly aligned with the arm 4 so that the initial contact of the stylus 23 with a record groove will be such that the stylus will descend into a groove rather than engage the top of a land or ridge. In actual operation, after initial engagement of the stylus 23 with the record groove for playback, the head 19 will be swung upwardly about the rod 22 to a position in which the slot 27 is clear of the pin 28. In this position the head 19 lies intermediate the position indicated in Figure 2 and in its uppermost position of movement. Lying in this intermediate position, the head 19 has no weight imposed on the same from the channel member 4, and thus the sole weight on the stylus 23 is determined by the design of the head itself, the usual heads of this type being physically designed by the manufacturer for operation at the correct load when pivoted at their end in the manner indicated for playback.

The manner of mounting the head 19 and the arm 3 allows a horizontal position of the head 19 to be substantially controlled by the movement of the channel member 4 which, it is to be understood, in practice is moved in accordance with the movement of the carriage. A slight horizontal movement, however, is permissible, due to a clearance in the matter of a few thousandths of an inch between the bearing faces 20 and the faces of the channel 21 of member 4, and a similar clearance between the head 19 and the rod 22. In other words, it is self-evident that the head 19, in addition to being able to rotate in a substantially vertical plane about the rod 22, is able to move bodily horizontally a very slight amount on the rod 22 within the close confines of the adjacent side walls of the stylus arm 3. This will allow the stylus 23 to follow a record groove for playback.

In recording operations the channel member is further lowered so as to now bring the point of the setscrew 29 into register with the opening 31 in the head 19, which has the effect of aligning and locking the head to the channel member 4 and removing the limited freedom provided for the head in the playback operations. The uncounterbalanced operation of the weight of the channel member 4, and the added weight 18, are now imposed on the stylus 23 for the added weight required in recording operations. The amount of this added weight is under control of the adjusting screw 14, which is connected with the partially counterbalanced spring 15.

While in Figures 1 to 3, inclusive, the recording head 19 has been indicated as having special bearing surfaces 20 of limited surface for guiding its movement within the channel member 4, these bearing faces of limited area may be provided by the channel member 4. Such a construction is illustrated in Figures 4 and 5, where a bearing surface such as indicated at 33 is provided.

While the particular form of the invention hereindescribed is well adapted to carry out the objects of the invention, it is to be understood that various changes and modifications may be made, and this invention is of the scope set forth in the appended claims.

It is claimed:

In a sound reproducing and recording apparatus, an arm having a pair of spaced apart upright side walls connected at one end by an upright end wall; means supporting said arm and limiting pivotal movement thereof to rotation about a horizontal axis; a recording and reproducing head having one end portion thereof disposed adjacent said end wall and being positioned between said side walls; means pivotally connecting said head directly to said side walls for free rotary movement relative thereto about a horizontal axis and for very slight horizontal movement relative to said arm limited by said side walls of said arm, there being a clearance of only a few thousandths of an inch between said head and said side walls to permit said slight horizontal movement of said head relative to said arm, said head having a vertical slot formed therein in the end adjacent said upright end wall, said slot being open at its lower end only; and a pin carried by said end wall, said pin being engageable with said slot through its lower open end for locating said head in predetermined transverse relation to said arm to insure a desired alignment of a stylus carried by said head with said arm so that the stylus upon initial engagement with a record for playback will engage with a groove rather than a land.

ALEXANDER E. DI GHILINI,
LEO E. DI GHILINI,

*Administrators of the estate of Ulrich L. di Ghilini, deceased.*

References Cited in the file of this patent

UNITED STATES PATENTS

| Number | Name | Date |
|---|---|---|
| 842,897 | Macdonald | Feb. 5, 1907 |
| 1,067,530 | Lindstrom | July 15, 1913 |
| 2,239,359 | Banning | Apr. 22, 1941 |
| 2,244,506 | Staszkiewiecz | June 3, 1941 |
| 2,254,412 | Badmaieff | Sept. 2, 1941 |
| 2,266,763 | Johnson | Dec. 23, 1941 |
| 2,294,576 | Schneider | Sept. 1, 1942 |
| 2,331,122 | Jones | Oct. 5, 1943 |
| 2,332,784 | De Sart | Oct. 26, 1943 |
| 2,455,466 | Brubaker | Dec. 7, 1948 |

FOREIGN PATENTS

| Number | Country | Date |
|---|---|---|
| 828,504 | France | Feb. 14, 1938 |
| 64,045 | Denmark | Oct. 22, 1945 |